United States Patent
Kim et al.

(10) Patent No.: US 9,300,480 B2
(45) Date of Patent: Mar. 29, 2016

(54) METHOD FOR MONITORING MACHINE TYPE COMMUNICATION DEVICE IN MOBILE COMMUNICATION SYSTEM

(75) Inventors: Taehyeon Kim, Gyeonggi-Do (KR); Hyunsook Kim, Gyeonggi-Do (KR); Laeyoung Kim, Gyeonggi-Do (KR)

(73) Assignee: LG ELECTRONICS INC., Seoul (KR)

( * ) Notice: Subject to any disclaimer, the term of this patent is extended or adjusted under 35 U.S.C. 154(b) by 762 days.

(21) Appl. No.: 13/501,741

(22) PCT Filed: Jan. 7, 2011

(86) PCT No.: PCT/KR2011/000124
§ 371 (c)(1),
(2), (4) Date: Jun. 12, 2012

(87) PCT Pub. No.: WO2011/084011
PCT Pub. Date: Jul. 14, 2011

(65) Prior Publication Data
US 2012/0264451 A1    Oct. 18, 2012

Related U.S. Application Data

(60) Provisional application No. 61/303,639, filed on Feb. 11, 2010, provisional application No. 61/293,204, filed on Jan. 8, 2010.

(30) Foreign Application Priority Data

Oct. 29, 2010  (KR) ......................... 10-2010-0107278

(51) Int. Cl.
*H04W 72/00*    (2009.01)
*H04L 12/12*    (2006.01)
(Continued)

(52) U.S. Cl.
CPC ................ *H04L 12/12* (2013.01); *H04L 41/06* (2013.01)

(58) Field of Classification Search
CPC ....... H04W 64/00; H04W 68/00; H04W 4/14; H04W 60/33
USPC ...................... 455/456.1, 466, 509, 517, 458
See application file for complete search history.

(56) References Cited

U.S. PATENT DOCUMENTS 5,151,896 A     9/1992  Bowman et al.
2005/0119008 A1  6/2005  Haumont
(Continued)

FOREIGN PATENT DOCUMENTS

EP          1727329         11/2006

OTHER PUBLICATIONS

"3rd Generation Partnership Project; Technical Specification Group Services and System Aspects; System Improvements for Machine-Type Communications; (Release 10)", 3GPP TR 23.888 V0.1.1, Dec. 2009.

(Continued)

*Primary Examiner* — Muthuswamy Manoharan
(74) *Attorney, Agent, or Firm* — Lee, Hong, Degerman, Kang & Waimey

(57) ABSTRACT

The present invention relates to a mobile communication system and, more particularly, to a method for monitoring the occurrence of an event of a machine type communication (MTC) service in a mobile communication system. In the method for performing MTC monitoring, among MTC features, in particular, when one or a plurality of particular events occur, the occurred events are detected, and when information regarding a corresponding MTC device of the detected event is transmitted to a network entity, the network entity checks stored information regarding the corresponding MTC device; compares the checked information and information regarding the corresponding MTC device of the event, and provides the comparison information or the event-related information to a server that manages and maintains the MTC device.

14 Claims, 2 Drawing Sheets

(51) Int. Cl.
*H04L 12/24* (2006.01)
*H04W 4/00* (2009.01)
*H04B 7/00* (2006.01)
*H04W 68/00* (2009.01)

(56) References Cited

U.S. PATENT DOCUMENTS

| | | | |
|---|---|---|---|
| 2006/0034198 A1* | 2/2006 | Makinen et al. | 370/310 |
| 2006/0221903 A1 | 10/2006 | Kauranen et al. | |
| 2010/0057485 A1* | 3/2010 | Luft | 705/1 |
| 2011/0199905 A1* | 8/2011 | Pinheiro et al. | 370/235 |
| 2011/0237281 A1* | 9/2011 | Busropan et al. | 455/507 |
| 2012/0196570 A1* | 8/2012 | Lindholm et al. | 455/411 |

OTHER PUBLICATIONS

"3rd Generation Partnership Project; Technical Specification Group Services and System Aspects; Service requirements for machine-type communications; Stage 1 (Release 10)", 3GPP TS 22.368 V1.1.1, Nov. 2009.

* cited by examiner

METHOD FOR MONITORING MACHINE TYPE COMMUNICATION DEVICE IN MOBILE COMMUNICATION SYSTEM

CROSS-REFERENCE TO RELATED APPLICATIONS

This application is the National Stage filing under 35 U.S.C. 371 of International Application No. PCT/KR2011/000124, filed on Jan. 7, 2011, which claims the benefit of earlier fining date and right of priority to Korean Application No. 10-2010-0107278, filed on Oct. 29. 2010, and also claims the benefit of U.S. Provisional Application Serial Nos. 61/303,639, filed on Feb. 11, 2010, and 61/293,204, filed on Jan. 8, 2010, the contents of which are all incorporated by reference herein in their entirety.

TECHNICAL FIELD

The present invention relates to a mobile communication system and, more particularly, to a method for monitoring the occurrence of an event of a machine type communication (MTC) service in a mobile communication system.

BACKGROUND ART

To deal with various forums and novel techniques in relation to 4th mobile communication system, 3GPP stipulating technical standards of 3rd mobile communication system started to study an LTE/SAE (Long Term Evolution/System Architecture Evolution) technique as part of efforts to optimize and improve the performance of 3GPP techniques in late 2004. The SAE, which has proceeded based on 3GPP SA WG2, relates to a network technology aiming at determining a network structure by interworking with an LTE operation of 3GPP TSG RAN and supporting mobility between heterogeneous networks. The SAE, one of the key standardization issues of 3GPP, is to advancing a 3GPP system to a system supporting various radio access techniques based on an IP, and working for an optimized packet-based system which may be able to minimize a transmission delay with improved data transmission capabilities.

Technical terms used in the present disclosure will now be described.

An MTC function is a function of supporting communication between MTC devices or between an MTC device and an MTC server, which performs communication without an intervention of a human being, unlike the existing person-to-person connection. For example, an MTC application may include communication between an automatic vending machine and a server, a POS (Point of Service) device and a server, an electricity or water meter and a server. Here, the corresponding device is called an MTC device. The MTC is also called machine-to-machine communication.

TA (Tracking Area) refers to an area in which an E-UTRAN provides a service, including one or a plurality of E-UTRAN cells. An RA (Routing area) refers to an area in which a GERAN/UTRAN provides a service, including one or a plurality of GERAN/UTRAN cells.

TAI (Tracking Area Identity) list refers to a list of TA identities identifying tracking areas a user equipment (UE) may enter without having to perform a TA updating procedure. The TAIs in the TAI list assigned by an MME (Mobility Management Entity) to a UE pertain to the same MME area. A detailed description of the TAI list will quote the matters stated in the standard document 3GPP TS 24.301 v9.1.0.

MME area: An MME area is the part of the network served by an MME. The MME area includes one or a plurality of TAs. All the cells served by an eNodeB are included in an MME area. A detailed description of the MME area will quote the matters stated in the standard document 3GPP TS 23.002 v9.2.0.

UMTS: It stands for Universal Mobile Telecommunication System, which means a 3G network.

EPS: It stands for Evolved Packet System, a core network supporting an LTE access network. Also, the EPS has evolved from UMTS.

NodeB: It is a base station of a UMTS network, which is installed in an outdoor area and has coverage of a macro cell size.

eNodeB: It is a base station of an EPS network, which is installed in an outdoor area and has coverage of a macro cell size.

UE: It stands for User Equipment, which means a UE device.

IMSI: It stands for International Mobile Subscriber Identity, which is a user's unique identifier assigned solely internationally in a mobile communication network.

SIM card: It stands for Subscriber Identity Module, which is used to have the same meaning as a SIM card.

MTC: It stands for Machine Type Communication, which refers to communication performed between machines without a human being's intervention.

MTC device: It refers to a UE (or UE) performing a particular purpose having a communication function through a core network. The UE may be, for example, a vending machine, a meter or a gauge, or the like.

MTC server: It refers to a server which manages an MTC device and transmits and receives data in a network.

MTC application: It is an actual application using an MTC device and an MTC server, including, for example, inspection of a meter, tracking a supply movement.

MTC feature: functions or features of a network supporting an MTC application, namely, some features, are required according to the purpose of respective applications. The MTC features may include, for example, MTC monitoring (e.g., required for a remote inspection of a meter in preparation for a loss of equipment), low mobility (e.g., in case of a vending machine, it scarcely moves.

RAN: It stands for Radio Access Network, which is a general term for 3GPP radio access such as RNC, NodeB, or eNodeB.

HLR (Home Location Register)/HSS (Home Subscriber Server): It is a database (DB) representing subscriber information within a 3GPP network.

RANAP: It stands for Radio Access Network Application Part, which refers to an interface between RAN and network nodes (MME/SGSN/MSC) which are in charge of handling a core network.

ICS (IMS Centralized Services): It stably provides a consistent service of IMS regardless of an access network to which a UE is attached (namely, although the UE is attached to a CS domain as well as to an IP-CAN). A detailed description of the ICS will quote the matters stated in the standard document 3GPP TS 23.292 v9.4.0.

IMS (IP Multimedia Subsystem): It refers to a system providing a multimedia service on the basis of an IP network.

Attach: It refers to a connection of a UE to a network node, including an attach generated in the occurrence of handover in a broad sense.

Point of attachment: It refers to an access point of a UE.

The present invention will now be explained with reference to the foregoing technical terms.

FIG. 1 is a conceptual view of a 3GPP service model for supporting MTC.

GSM/UMTS/EPS of 3GPP standard defines communication through a PS network, but in the present invention, a method applicable even to a CS network will be described. A definition of a network architecture in a current technical standard has been proposed to use an existing bearer of 3GPP. Meanwhile, a method of using an SMS (Short Message Service) for exchanging data between an MTC device and an MTC server has been proposed as one of alternative solutions. The use of SMS has been proposed in consideration of the fact that a small amount of digital data such as metering information, product information, or the like, is handled in UEs of the MTC application, by which the existing SMS method and an SMS method on the basis of an IMS can be supported In FIG. 1, MTCsms is a data exchange interface through the existing SMS method, and MTCi is a data exchange interface through the IMS-based SMS method. In addition, there are methods for regulating a paging range for an MTC application with a little mobility.

The 3GPP system such as the conventional GSM/UMTS/EPS is defined for communication between end-users, namely, between human beings. However, the conventional mobile communication system is not effective for communication between an MTC device and an MTC server, and also not an optimized communication solution. Thus, recently, 3GPP has set to work to define functions and mechanisms for exchanging data between the MTC device and the MTC server, but detailed, substantial methods still remain insufficient. Also, in terms of numerous MTS applications, the MTC device is independently installed and operated without a human being's operation. In this state, the MTC device may be lost, broken down, or malfunction, so in order to automatically manage the MTC device, there is a need to check (or monitor) whether or not the MTC device is in an online or offline. Also, in order to check whether or not the MTC device is in online or offline, a technical necessity to be supported by the function of an existing network system, e.g., a 3GPP core network, rather than establishing a network and a system to a separate management is required. Namely, the advantages of maximizing utilization and efficiency of communication of the existing network and channel resources can be obtained by using the existing network infrastructure.

DISCLOSURE OF INVENTION

Solution to Problem

Therefore, in order to address the above matters, the various features described herein have been conceived.

An aspect of the present invention provides a machine type communication (MTC) monitoring method, one of MTC features, capable of managing MTC devices by informing a network about the occurrence of an event when the event occurs in an MTC device.

According to an aspect of the present invention, there is provided a method for monitoring an machine type communication (MTC) device in a mobile communication system, including: (A) receiving, by a core network node, MTC subscription information (herein, called as a first MTC information) of a UE from a home subscriber server (HSS); (B) receiving, MTC information (herein, as called a second MTC information) and location information of the UE from the radio access network (RAN); (C) monitoring, by the core network node, whether or not an event occurs, by comparing the MTC subscription information of the UE received from the HSS and the MTC information and location information of the UE received from the RAN; and (D) when an event occurs through monitoring, notifying a reporting server about the occurred event.

The method may further include: determining, by the core network node, whether or not the UE is an MTC device on the basis of the MTC information of the UE received from the RAN.

The method may further include: when the UE is determined to be an MTC device, requesting, by the core network node, an identifier (e.g., International mobile equipment identity (IMEI)) of the MTC device from the UE; and receiving, by the core network node, the identifier of the MTC device from the UE.

The method may further include: including, by the core network node, a parameter including information for limiting the operation of the UE on the basis of the occurred event into a control message and transmitting the control message.

The control message may be an attach accept message using a NAS(Non Access Stratum) message, or a location registration permission message using a NAS message.

The step (A) may include: transmitting, by the core network node, an ACK message with respect to a reception of the MTC subscription information to the HSS.

The MTC subscription information may include one or more of an 'MTC device indicator' indicating that the UE is an MTC device, an 'Allowed Feature list' including a list of features to be monitored; an 'Events list for monitoring' including an event list to be monitored', an 'Allowed Location list' including a list of locations allowed for the UE to use, and an 'Allowed IMEI' indicating information of MTC devices allowed to be used.

In step (B), the MTC information and the location information are included in a message of an attach procedure or a message of a location updating procedure, wherein the message of an attach procedure and the message of a location updating procedure may use a NAS message.

The MTC information may include one or more of a subscriber identifier (IMSI) and an 'MTC device indicator', and the location information may include one or more of a CGI (cell global ID), a TAI (Tracking Area Identity), and an RAI (Routing Area Identity).

In step (C), the identifier (IMEI) of the MTC device of the UE received by the core network node and the information regarding the MTC devices allowed to be used and included in the MTC subscription information of the UE may be compared to monitor whether or not the UE is an available MTC device.

In step (C), the location information received by the core network node and the information regarding the location allowed for the UE to use and included in the MTC subscription information of the UE may be compared to monitor whether or not the UE is an available MTC device.

In step (C), the core network node may compare the received MTC information with the event list included in the MTC subscription information of the UE to monitor whether or not an event of the UE occurs.

In step (D), when the core network node notifies the reporting server about the occurred event, it may provide one or more of information regarding a subscriber identifier (IMSI), the device identifier (IMEI) of the UE, an event occurrence time, and an event occurrence location.

The core network node may be one of an MME (mobility management entity), an SGSN (Serving GPRS Supporting Node), and an MSC (Mobile Switching Center).

According to exemplary embodiments of the present invention, the 3GPP GSM/UMTS/EPS system supports the MTC (Machine Type Communication) function to make communication between a machine and a server available.

In particular, the core network checks (notifies about) an offline state of the MTC to detect whether or not the MTC device is broken down, malfunctions, or whether or the MTC device has been lost, and informs the user of the MTC device accordingly, thus accomplishing an automated management.

The foregoing and other objects, features, aspects and advantages of the present invention will become more apparent from the following detailed description of the present invention when taken in conjunction with the accompanying drawings.

MODE FOR THE INVENTION

Figure 1:
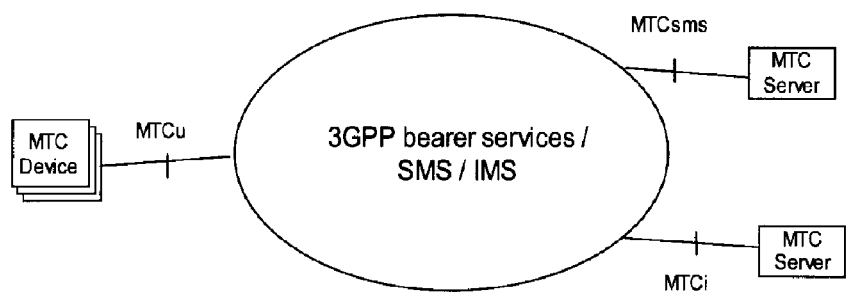
FIG. 1 is a conceptual view illustrating a 3GPP service model for supporting MTC (Machine Type Communication)

The present invention is applied to a mobile communication system using MTC (Machine Type Communication); however, the present invention is not limited thereto and may also be applied to next-generation mobile communication and any other wired/wireless communication to which the technical concept or idea of the present invention is applicable.

The present invention may be embodied in many different forms and may have various embodiments, of which particular ones will be illustrated in drawings and will be described in detail. However, it should be understood that the following exemplifying description of the invention is not meant to restrict the invention to specific forms of the present invention but rather the present invention is meant to cover all modifications, similarities and alternatives which are included in the spirit and scope of the present invention.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. The term "and/or" encompasses both combinations of the plurality of related items disclosed and any item from among the plurality of related items disclosed.

It will be understood that when an element is referred to as being "connected with" another element, it can be directly connected with the other element or intervening elements may also be present. In contrast, when an element is referred to as being "directly connected with" another element, there are no intervening elements present.

The terms used in the present application are merely used to describe particular embodiments, and are not intended to limit the present invention. An expression used in the singular encompasses the expression of the plural, unless it has a clearly different meaning in the context. In the present application, it is to be understood that the terms such as "including" or "having," etc., are intended to indicate the existence of the features, numbers, operations, actions, components, parts, or combinations thereof disclosed in the specification, and are not intended to preclude the possibility that one or more other features, numbers, operations, actions, components, parts, or combinations thereof may exist or may be added.

Unless otherwise defined, all terms used herein, including technical or scientific terms, have the same meanings as those generally understood by those with ordinary knowledge in the field of art to which the present invention belongs. Such terms as those defined in a generally used dictionary are to be interpreted to have the meanings equal to the contextual meanings in the relevant field of art, and are not to be interpreted to have ideal or excessively formal meanings unless clearly defined in the present application.

A UE according to an exemplary embodiment of the present invention may refer to any device that may be able to perform technical features or characteristics of the present invention. Namely, the UE according to an exemplary embodiment of the present invention has a comprehensive meaning enough to include a mobile communication UE capable of performing an MTC service function (e.g., a pacemaker, a vending machine, a power meter, air pollution measurement device, and the like), a user equipment (UE), human-centered devices (e.g., a mobile phone, a portable phone, a DMB phone, a game phone, a camera phone, a smartphone, and the like), a notebook computer, a desktop computer, a laptop computer, a palmtop computer, a personal digital assistant (PDA), white appliances (or consumer white goods), and the like.

Embodiments of the present invention will be described below in detail with reference to the accompanying drawings, where those components are rendered the same reference number that are the same or are in correspondence, regardless of the figure number, and redundant explanations are omitted.

The present invention provides a method for performing MTC monitoring, among MTC features. In particular, when one or a plurality of particular events occur, the occurred events are detected, and when information regarding a corresponding MTC device of the detected event is transmitted to a network entity, the network entity checks stored information regarding the corresponding MTC device; compares the checked information and information regarding the corresponding MTC device of the event, and provides the comparison information or the event-related information to a server that manages and maintains the MTC device. Here, examples of the event are as follows: 1) An event in which there is a change in a point of attachment is detected. Namely, an access to an area other than areas allowed for an MTC device is detected; 2) An event in which there is a change in the relevance (or association) between a UICC (Universal Integrated Circuit Card or a SIM card) and a device allowed for use the card is detected. Namely, it is detected whether or not the UICC or the SIM card is used for an MTC device other than a device for which the UICC or the SIM card is allowed to be used; 3) An event in which an operation not consistent with activated MTC features is detected.

In order to support the MTC monitoring function in consideration of a 3GPP core network in the present exemplary embodiment, the following matters are presumed for an MTC user (or an MTC system): 1) The MTC user sets events of a target to be detected; 2) An MTC device for which the UICC or the SIM card is used is designated; 3) An area in which the MTC device is to operate is designated; 4) Such matters are stored in a subscriber (i.e., MTC device) database; 5) The RAN delivers location information to a network entity (e.g., an MME); 6) When a cell is changed, the MTC device provides its ID and a device ID to the network entity; 7) A core network node (e.g., an MME, an SGSN, or an MSC) detects an event on the basis of the delivered MTC device, RAN information, and subscriber information; 8) When an event is detected, the core network informs an MTC server or the user about the event occurrence and may limit the use of radio resources of a corresponding MTC device.

Figure 2:
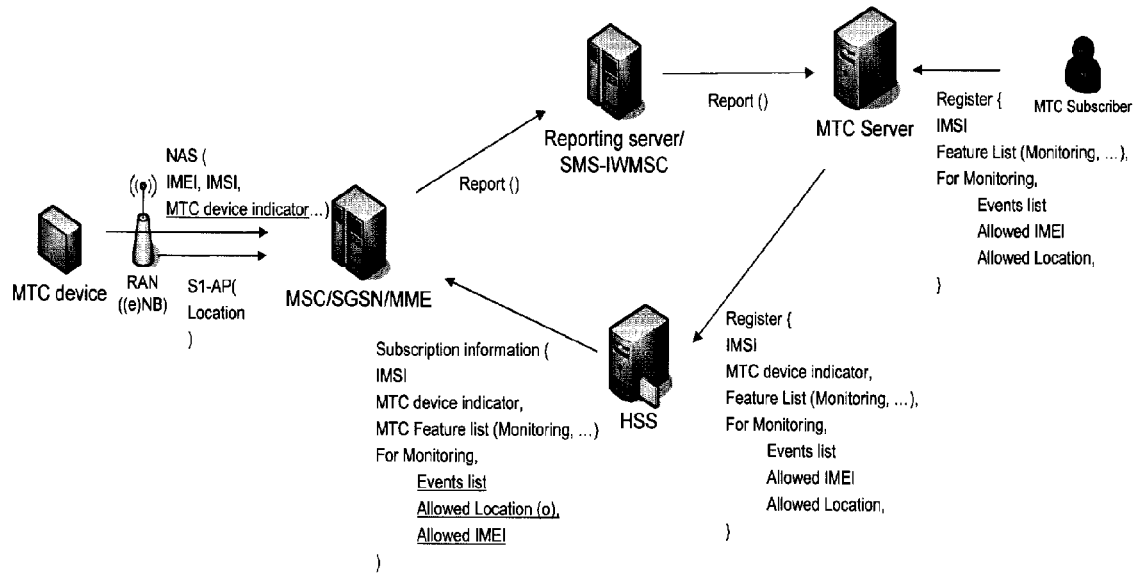
FIG. 2 is a conceptual view illustrating a core network architecture for MC monitoring and transmission parameter.

FIG. 2 is a conceptual view illustrating a core network architecture for MTC monitoring and transmission parameter.

As shown in FIG. 2, a core network node handling MTC monitoring may be one of an MSC, an SGSN, and an MME. Namely, when the MSC uses circuit switching (CS) access in a 2G or 3G network, when the SGSN uses a packet switching (PS) access in the 2G or 3G network, and when the MME uses a PS access in an EPS network, the MSC, the SGSN, and the MME operates. To this end, the subscription information is stored in a user DB such as an HLR or an HSS, and the subscription information is delivered to the core network node in the case of attach. In the occurrence of attach or in the occurrence of TAU/RAU/LAU/handover, monitoring is performed by using information delivered from the MTC device or the RAN. When an event is detected in monitoring the MTC device, the core network node informs a server (i.e., a reporting server and/or an MTC server0 or the user (namely, an MTC subscriber) about the detected event.

In the present invention, in order to perform MTC monitoring on the basis of the architecture as illustrated in FIG. 2, the following processes are performed: 1) registering subscription information to a core network; 2) performing MTC monitoring on an event on the basis of the subscription information registered to the core network; and 3) informing about the monitored event. The process of performing MTC monitoring will now be described in detail.

(1) The subscription information is registered to the core network as follows.

In order to support an M2M service with respect to the MTC device in a mobile communication network, content required for subscriber information must be set. Namely, the MTC user records subscription information in the MTC server. For example, the subscription information required for the MTC device is as shown in Table 1 below. Each of the subscription information in Table 1 may have a parameter (or element) format

TABLE 1

IMSI
MTC device indicator
Allowed Feature list (Monitoring, . . .)
For MTC monitoring
    Events list for monitoring
    Allowed location list
    Allowed IMEI The information (or parameter) of Table 1 will be described as follows. 'MTC device indicator' is an indicator (or parameter) indicating that the UE is a MTC device. Namely, the MTC device as a target of M2M service must be employed in a form different from the existing human-to-human communication service. In the subscription information, it must be discriminated whether or not it is a person or a device. To this end, in order to indicate that the UE is an MTC device in the subscription information, an MTC device indicator is used. Meanwhile, optionally, the fact that a device is a target of the M2M service may be indicated by using a particular value in an ID (e.g., IMSI, and the like), allocating a particular range, or the like.

'Allowed Feature list' refers to a list of features to be used for the UE. Here, as defined above, the features refer to the functions or features of the network for supporting an MTC application, and various features may be used together according to a purpose to use the MTC device. Also, each feature may require individual attributes.

In case of the 'MTC monitoring' (In Table 1, for MTC monitoring), among the features in Table 1, attributes such as 'Event list for Monitoring', 'Allowed Location list', 'Allowed IMEI', and the like, are required. In this case, the 'Event list for Monitoring' is a list of events to be determined in case of monitoring. The 'Allowed Location list' indicates the range of an area in which the MTC device is to operate. The 'Allowed IMEI' is an attribute used to check the relevance between the UICC and a device. Namely, it refers to an id (identification) of the MTC device for which the UUICC or SIM card (i.e., IMSI) may be used.

Meanwhile, in Table 1, the IMSI ((International Mobile Subscriber Identity) is a unique identification number (identifier) of a subscriber for identifying the subscriber, and the IMEI (International Mobile Equipment Identity) is a unique identification number (identifier) of a device (UE) for identifying the device.

When the MTC user records the information as shown in Table 1 in an MTC server, the MTC server delivers the same to an HLR/HSS, a subscriber information DB of the core network. Meanwhile, when the information of Table 1 is stored in the HLR/HSS, a node of the 3GPP core network, location information is stored in the form of an id expressing the area used in the 3GPP network such as TAI, RAI, LAI, CGI, or ECGI.

Meanwhile, the information of Table 1 is delivered to the core network node in the occurrence of attach or when the core network requests it.

Table 2 shows an example of subscription information registered to the MTC server according to an exemplary embodiment of the present invention.

In Table 2, an 'IMSI' value of the UE is '0314504130'.

'MTC device indicator' indicates that the UE is an MTC device.

A feature to be employed for the MTC device in Table 2 is the features of 'monitoring' and 'offline indication'.

An event to be detected by performing 'monitoring', the first feature, includes a data limit, abnormal data, and the like.

An allowed location list is Cell1, Cell2, and Cell3 areas

Allowed IMEI (International Mobile Equipment Identity): UE must be used only in an LG-AA00508 device.

For the offline indication, the second feature, a detection time is set to two minutes (namely, the offline state of the UE must be checked at every two minutes).

TABLE 2

| Classification | Attribute | Application example |
| --- | --- | --- |
| IMSI | | 0314504130 |
| MTC device indicator | | "MTC device" |
| Allowed Feature list | | (Monitoring, Offline indication) |
| For MTC monitoring | | |
| | Events list for Monitoring | data limit, abnormal data, etc. |
| | Allowed Location list, Allowed IMEI | Cell1, Cell2, Cell3 LG-AA00509 |
| For Offline indication | | |
| | Detection time | 2 min |

(2) MTC monitoring method will now be described.

In the present exemplary embodiment, the monitoring purpose is to detect an event such as an event in which the MTC device gets out of the area or erroneously used, rather than preventing the MTC device (UE) from getting out of the area or from being erroneously used.

Meanwhile, the following three procedures are performed to detect an event through monitoring.

Detection of relevance between UICC and MTC device: First, the SGSN/MME/MSC requests the IMEI of the MTC device from the UE (namely, the MTC device). Then, the UE provides the IMEI to the SGSN/MME/MSC. The SGSN/MME/MSC compares the IMEI which has been provided from the UE 10 with the 'Allowed IMEI' included in the subscriber information delivered from the HLR/HSS to check whether or not the UE 10 is an allowed device. Or otherwise, it is an event in which a device not allowed uses it, the SGSN/MME/MSC informs the reporting server about the occurrence of the event.

Detection of a change in a point of attachment: When the UE moves to a different cell, the UE delivers an access message to the SGSN/MME/MSC. In this case, the RAN also delivers location information of a current cell to the core network node. The core network node compares the location information of the current cell delivered from the RAN with the 'Allowed Location list' in the subscriber information delivered from the HLR/HSS to check whether or not the UE is used in an allowed area. If the cell into which the UE has moved is not an area on the 'Allowed Location list', it is a case in which an event has occurred, so the core network node informs the reporting server about the occurred event.

Detection of a behaviour which does not correspond with the activated MTC features: The SGSN/MME/MSC checks whether or not the operation (behaviour) of the MTC device operates to correspond with content set in the 'Event list for monitoring'. When the operation does not correspond, it means that an event has occurred, so the SGSN/MME/MSC informs the reporting server about the occurred event.

(3) A method for informing about an event will now be described.

When the MTC device (i.e., the UE) is erroneously used or operates outside of the allowed area on the basis of a pre-set event during the monitoring operation (namely, when an event occurs), the MTC server or the MTC user is informed accordingly. When the event is informed, the following information is included:

IMSI: UICC ID of MTC device;
Event type: Type of occurred event (or generated event) (e.g., monitoring—Allowed location error);
Occurrence time: Event occurrence time (e.g., unit of second)
Location: Event occurrence location (e.g., cell id, etc.)
Device ID (IMEI): id of device in use (e.g., delivered IMEI).

A sequential process of registering the subscriber information to the MTC server, monitoring an event occurrence, and reporting an occurred event will now be described with reference to FIG. 3.

Figure 3:
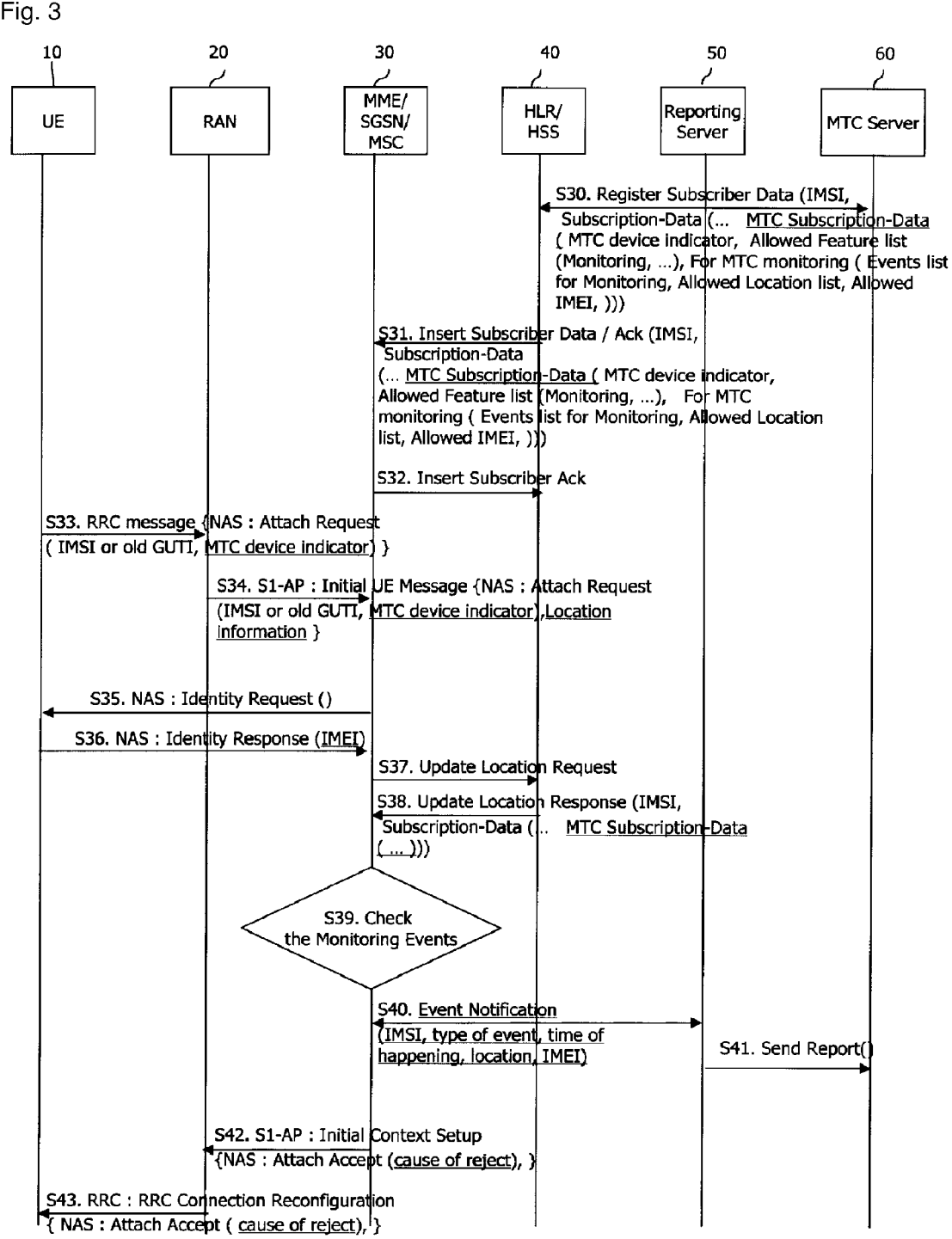
FIG. 3 is a signal flow chart illustrating the process of a method for monitoring the occurrence of an event of an MTC device according to an exemplary embodiment of the present invention.

FIG. 3 is a signal flow chart illustrating the process of a method for monitoring the occurrence of an event of an MTC device according to an exemplary embodiment of the present invention.

In FIG. 3, the core network node handling MTC monitoring is the MSC, the SGSN, or the MME, and the monitoring process in the embodiment of FIG. 3 is performed in an attach procedure, but it may be also similarly applied for the case of TAU/RAU/LAU/Handover.

The MTC user registers subscription information) i.e., Register Subscriber Data in FIG. 3) to an MTC server 60. The MTC server 60 delivers the subscription information to the HLR/HSS 40 (step S30).

In this case, the information registered to the MTC server is as described above with Table 1. Meanwhile, the MTS server 60 exists outside the 3GPP core network, so the storage format may be non-standard, but it transmits data in a standard format to the HLR/HSS 40, the 3GPP core network node.

The HLR/HSS 40 transmits the subscription information, which has been received from the MTC server 60, to the core network node, i.e., to an MME/SGSN/MSC 30 that performs monitoring in FIG. 3, by using an 'Insert Subscriber Data' message (step S31). Here, as for the MME/SGSN/MSC 30, a node, i.e., a network entity, for performing monitoring is different according to types of networks, so the three nodes are described as one node for the sake of convenience. In step S31, as described above with reference to Table 1, the core network node (i.e., one of the MME, SGSN, and MSC) 30 performing monitoring receives subscriber information (or subscriber data) such as "MTC device indicator' indicating whether or not a monitoring target is an MTC device and features for performing the MTC monitoring (e.g., 'Allowed location list, Allowed IMEI)'. Referring to step S31, the subscription information is configured on the basis of subscriber information of 3GPP for the sake of convenience. Namely, the subscriber information of 3GPP is configured as subscription data using an IMSI as a main index. An element (or parameter) (Subscription-Data element) of the subscription data includes several sub-elements. For the MTC device, 'MTC-Subscription-Data' is newly defined in which 'MTC device indicator' and 'Allowed Feature list (Offline indication, . . . )' are configured, and several event lists, 'Events list for Monitoring', 'Allowed Location list', 'Allowed IMEI', are configured and delivered. Meanwhile, in a different embodiment, the 'MTC device indicator' may be used together with an IMSI to indicate the MTC device.

The MME/SGSN/MSC 30 transmits an Ack message (Insert Subscriber Ack in FIG. 3) informing that the subscriber information has received to the HLR/HSS 40 (step S32).

Through the steps S30 to S32, the subscription information such as an event desired to be searched by the MTC user is registered to the core network node (one of MME, SGSN, and MSC), and the network receives the message of the Attach procedure or the message of the location update procedure delivered (e.g., TAU, RAU, and the like) by the UE and monitor the MTC device according to an exemplary embodiment of the present invention.

For example, the UE 10 transmits 'IMSI' or 'temporary ID', an ID of the UE 10, and 'MTC device indicator' to the RAN 20 through a NAS attach request message, for its attach to the network (step S33). Meanwhile, when the 'temporary ID', rather than the 'IMSI', is transmitted, the RAN 20 requests the IMSI of the UE 10 from a previous core network node, to which the UE 10 has been previously connected, and receives the IMSI of the UE 10. The 'MTC device indicator' is a parameter (or element) indicating that the UE 10 is an MTC device. The RAN 20 may recognize that the Attach request has been delivered from the MTC device through the transferred 'IMSI' or 'MTC device indicator'. Meanwhile, alternatively, a particular value may be used for the ID (namely, the IMSI or the temporary ID) or a particular range may be assigned to the ID.

The RAN 20 includes its location information in the NAS attach request message received from the UE 10 and transmits it to the MME/SGSN/MSC 30 (step S34). Namely, the RAN 20 includes the NAS message delivered from the UE 10 in an S1-AP message and transmits the same, and in this case, the RAN 20 also delivers location information (e.g., CGI (cell global ID), TAI (Tracking Area Identity), RAI (Routing Area Identity). The location information is delivered in order to monitor in a change of the point of attachment.

Meanwhile, in steps S33 and S34, the RRC in the message prefix is a message transmitted from the UE 10 to the RAN 20, the S1-AP is a message transmitted from the RAN 20 to the MME/SGSN/MSC 30, and the NAS is a message transmitted from the UE 10 to the MME/SGSN/MSC 30. In this case, the NAS may be included as a parameter within the RRC or the S1-AP message and transmitted.

The MME/SGSN/MSC 30 receives an attach request through the NAS message and determines whether or not the UE 10 which has requested the Attach is an MTC device. In this case, whether or not the UE 10 is an MTC device or not may be determined on the basis of the 'MTC device indicator', the 'IMSI', or the ID included in the Attach request message of step S34. or, through the steps S30 and S31, the MME/SGSN/MSC 30 may determine that the UE 10 is an MTC device according to already stored subscription information. When the UE 10 is an MTC device, the MME/SGSN/MSC 30 requests IMEI information, current device information, from the UE 10 by using an 'Identity Request' message, a NAS message (step S35).

The UE delivers the 'Identity Response message, a NAS message, to the MME/SGSN/MSC 30 according to the request from the MME/SGSN/MSC 30 of step S35 (step S36). Here, the 'IMEI' is delivered to monitor a change in the relation between the UICC and a device allowed to be used.

Meanwhile, when the MME/SGSN/MSC 30 does not have the subscription information of the UE 10, the subscription information is received through an 'Update Location Request' message and an 'Update Location Response' message between the MME/SGSN/MSC 30 and the HLR/HSS 40 (steps S37 and S38). In this case, received content is the same as the subscription information of step S31.

The MME/SGSN/MSC 30 compares the information obtained in steps S34 and S36 and the information (namely, the subscription information) retained in steps S31 to S38 to monitor whether or not an event has occurred (e.g., an erroneous use of the MTC information (a change in the relevance between the UICC and the device allowed to use the UICC), whether or not the device gets out of an allowed range, etc.) (step S39). When viewed based on the subscription information registered in step S31, a monitoring target is as follows:

That is, in order to detect the relevance between the UICC and the MTC device (namely, UE), the IMEI delivered from the UE 10 and the 'Allowed IMEI' stored (or included) in the subscription information are compared.

Also, in order to detect a change in the point of attachment, the location information (CGI (cell global ID), TAI, RAI, etc.) delivered from the RAN 20 in step S34 and the 'Allowed Location List' included (or stored) in the subscription in step S31.

In order to detect a behavior not agreed with the activated MTC features, it is checked whether or not the behavior of the MTC device operates according to content set in the 'Event list for monitoring'.

When the MME/SGSN/MSC 30 in step S39 detects an occurrence of an event by monitoring the EU 10 (namely, the MTC device) (e.g., an erroneous use of the MTC device, the case in which the MTC device operates outside an allowed range, etc., upon checking the IMEI), the MME/SGSN/MSC 30 informs the reporting server 50 about the occurred event (step S40). In this case, the 'Event Notification' message includes 'IMSI', 'type of event', time of happening, location, device ID (IMEI), and the like, and the message is delivered to the reporting server. Meanwhile, the 'Event Notification' message may be delivered in the form of NAS or a message of a similar form, in the form of SMS, or the like.

The report server 50 delivers the event generation message (send report) to the MTC server 60 so that the user can be informed or take a particular step (step S41).

Meanwhile, when no event occurs, the MME/SGSN/MSC 30 delivers an Attach accept message by using a NAS message to the UE 10 by way of the RAN 20 (step S42 to S43). Meanwhile, when a particular event occurs, the MME/SGSN/MSC 30 may limit the UE's behaviour, and it may include the limitation matter ('cause of reject' in FIG. 3) in the attach accept message and deliver the same. In this case, a list of the reasons for limitation of the user or reject features may be delivered through a 'cause of reject' parameter, and the UE may limit the function of a particular feature on the basis of information indicated by the 'cause of reject' parameter.

The present invention has been described on the basis of the E-UTRAN/EPS, but it can be also applicable to a procedure for the purpose of the legacy 3GPP system.

The method described so far may be implemented by software, hardware or their combination. For example, the method according to the present invention may be stored in a storage medium (e.g., an internal memory, a flash memory of a mobile terminal, a hard disk, or the like), and may be implemented by codes or command languages in a software program that can be executed by a processor (e.g., an internal microprocessor of a mobile terminal).

As the present invention may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

The invention claimed is:

1. A method for monitoring a machine type communication (MTC) device in a mobile communication system, the method comprising:

receiving, by a core network node, a first MTC information of a UE from a home subscriber server (HSS), wherein the first MTC information includes an 'Allowed Feature list' including a list of features to be employed for the MTC device, and the 'Allowed Feature list' comprises a 'monitoring' indication;

receiving a second MTC information and location information of the UE from a radio access network (RAN);

monitoring, by the core network node, whether or not an event occurs by comparing the first MTC information of the UE received from the HSS and the second MTC information of the UE received from the RAN, when an attach procedure, TAU (Tracking Area Update), RAU (Routing Area Update), or LAU (Location Area Update) is performed by the MTC device;

notifying a reporting server about the occurred event and transmitting a first control message comprising a parameter for limiting the operation of the UE based on the occurred event to the MTC device, when the monitoring indicates that the event has occurred, wherein the MTC device limits the operation based on information indicated by the parameter; and transmitting a second control message without the parameter to the MTC device, when the monitoring indicates that the event has not occurred, wherein the event is one of a 'data limit' or an 'abnormal data'.

2. The method of claim 1, further comprising:

determining, by the core network node, whether or not the UE is the MTC device based on the second MTC information of the UE received from the RAN.

3. The method of claim 2, further comprising:

when the UE is determined to be the MTC device, requesting, by the core network node, an identifier of the MTC device from the UE, wherein the identifier is international mobile equipment identity (IMEI); and receiving, by the core network node, the identifier of the MTC device from the UE.

4. The method of claim 3, wherein, in the step of monitoring, by the core network node, whether or not the event occurs by comparing the first MTC information of the UE received from the HSS and the second MTC information of the UE received from the RAN, the identifier of the MTC device of the UE received by the core network node and information regarding MTC devices allowed to be used and included in the first MTC information of the UE are compared to monitor whether or not the UE is an available MTC device.

5. The method of claim 1, wherein the first control message is an attach accept message using a Non-Access Stratum (NAS) message, or a location registration permission message using a NAS message.

6. The method of claim 1, wherein the receiving, by the core network node, the first MTC information of the UE from the HSS comprises:

transmitting, by the core network node, an ACK message with respect to a reception of the first MTC information to the HSS.

7. The method of claim 1, wherein the first MTC information comprises one or more of:

an 'MTC device indicator' indicating that the UE is the MTC device;

an 'Events list for monitoring' including an event list to be monitored;

an 'Allowed Location list' including a list of locations allowed for the UE to use; and an 'Allowed IMEI' indicating information of MTC devices allowed to be used.

8. The method of claim 1, wherein, in the step of receiving the second MTC information and location information of the UE from the RAN, the second MTC information and the location information are included in a message of an attach procedure or a message of the location updating procedure, wherein the message of an attach procedure and the message of the location updating procedure use a NAS message.

9. The method of claim 8, wherein the second MTC information comprises one or more of a subscriber identifier (IMSI) and an 'MTC device indicator', and the location information may include one or more of a CGI (cell global ID), a TAI (Tracking Area Identity), and an RAI (Routing Area Identity).

10. The method of claim 1, wherein, in the step of monitoring, by the core network node, whether or not the event occurs by comparing the first MTC information of the UE received from the HSS and the second MTC information of the UE received from the RAN, the location information received by the core node network and information regarding a location allowed for the UE to use and included in the first MTC information of the UE are compared to monitor whether or not the UE is an available MTC device.

11. The method of claim 1, wherein, in the step of monitoring, by the core network node, whether or not the event occurs by comparing the first MTC information of the UE received from the HSS and the second MTC information of the UE received from the RAN, the core network node compares the received second MTC information with an event list included in the first MTC information of the UE to monitor whether or not an event of the UE occurs.

12. The method of claim 1, wherein, when the monitoring indicates that the event has occurred, the core network node provides one or more of information regarding a subscriber identifier (IMSI), the device identifier (IMEI) of the UE, an event occurrence time, and an event occurrence location to the reporting server.

13. The method of claim 1, wherein the core network node is one of an MME (mobility management entity), an SGSN (Serving GPRS Supporting Node), and an MSC (Mobile Switching Center).

14. An apparatus configured to monitor a machine type communication (MTC) device in a mobile communication system, the apparatus comprising:

a receiver; and a processor operatively connected to the receiver and configured to:

receive a first MTC information of a UE from a home subscriber server (HSS), wherein the first MTC information includes an 'Allowed Feature list' including a list of features to be employed for the MTC device, and the 'Allowed Feature list' comprises 'monitoring' indication;

receive a second MTC information and location information of the UE from a radio access network (RAN);

monitor whether or not an event occurs by comparing the first MTC information of the UE received from the HSS and the second MTC information of the UE received from the RAN, when an attach procedure, TAU (Tracking Area Update), RAU (Routing Area Update) or LAU (Location Area Update) is performed by the MTC device; and notify a reporting server about the occurred event and transmit a first control message comprising a parameter for limiting the operation of the UE based on the occurred event to the MTC device, when the monitoring indicates that the event has occurred, wherein the MTC device limits the operation based on information indicated by the parameter; and transmit a second control message without the parameter to the MTC device, when the monitoring indicates that the event has not occurred wherein the event is one of a 'data limit' or an 'abnormal data'.

* * * * *